United States Patent [19]
Sedlmayer

[11] Patent Number: 6,079,658
[45] Date of Patent: Jun. 27, 2000

[54] DEVICE HAVING TENSION CONTROL MEANS INCLUDING A COIL SPRING FOR CONTROLLING THE TENSION IN AN ELONGATE MATERIAL

[75] Inventor: Thomas Sedlmayer, Vienna, Austria

[73] Assignee: U.S. Philip Corporation, New York, N.Y.

[21] Appl. No.: 09/264,042

[22] Filed: Mar. 8, 1999

[30] Foreign Application Priority Data

Mar. 27, 1998 [EP] European Pat. Off. .............. 98890084

[51] Int. Cl.$^7$ .................................................. B65H 23/18
[52] U.S. Cl. ................................... 242/413.3; 242/334.6; 242/421.8; 242/422.4
[58] Field of Search ............................ 242/334.6, 413.3, 242/421.5, 421.8, 421.9, 422.8, 422.4

[56] References Cited

U.S. PATENT DOCUMENTS

| | | | |
|---|---|---|---|
| 3,405,791 | 10/1968 | Kaplan | 242/422.4 X |
| 3,539,129 | 11/1970 | Schmidt et al. | 242/334.6 |
| 5,167,380 | 12/1992 | Choi | 242/334.6 |
| 5,709,348 | 1/1998 | Kim | 242/334.6 |
| 5,769,350 | 6/1998 | Oka | 242/422.4 |
| 5,927,631 | 7/1999 | Yoo | 242/334.6 |
| 5,934,593 | 8/1999 | Okuie | 242/334.6 X |

FOREIGN PATENT DOCUMENTS

| | | | |
|---|---|---|---|
| 0182419 | 5/1989 | European Pat. Off. . | |
| 358118052 | 3/1971 | Japan | 242/334.6 |
| 406203431 | 7/1994 | Japan | 242/334.6 |
| 1225008 | 3/1971 | United Kingdom | 242/421.8 |

*Primary Examiner*—Donald P. Walsh
*Assistant Examiner*—Emmanuel M. Marcelo
*Attorney, Agent, or Firm*—Leroy Eason

[57] ABSTRACT

A device in which an elongate material which can be wound in the form of a roll is driven in a transport direction. The device has tension control means for controlling the tension in the material when the material is driven, which tension control means comprise a flexible braking member which is passed around a braking drum. The braking member is formed by a coil spring which has two spring arms, one of which is movable in order to influence the braking force of the coil spring in dependence on the instantaneous tension in the material.

7 Claims, 3 Drawing Sheets

DEVICE HAVING TENSION CONTROL MEANS INCLUDING A COIL SPRING FOR CONTROLLING THE TENSION IN AN ELONGATE MATERIAL

BACKGROUND OF THE INVENTION

The invention relates to a device in which an elongate material which can be wound in the form of a roll is drivable in a transport direction, the device having drive means for driving the material in the transport direction. The drive means comprise a winding spindle for driving a roll of the material, which winding spindle is in driving engagement with a cylindrical braking drum, and which has tension control means for controlling the tension which occurs in the material when the material is driven in the transport direction. The tension control means comprise a movably supported control member and spring means which act on the control member and load it in a given direction of movement, and a sensor arranged on the control member. The material is passed around the sensor via which the control member is movable against the given direction of movement, opposed by the force of the spring means, in accordance with the tension occurring in the material when the material is driven in the transport direction. A flexible braking member is passed around the cylindrical circumferential surface of the braking drum and has a movable braking member portion which extends away from the braking drum and is movable with the aid of a control portion of the control member in order to influence the braking action of the braking member on the braking drum.

Such a device is known, for example, from the document EP 0 182 419 B1. The known device is a magnetic tape apparatus, namely a so-called video recorder, by means of which video signals can be recorded on a drivable magnetic tape and can be reproduced therefrom. The known device has tension control means which include a braking drum which is coaxial with a winding spindle and a flexible braking member formed by a braking band which is passed around the braking drum. A braking band portion which extends away from the braking drum cooperates with a control portion of a pivotable control member in order to influence the braking action of the braking band on the braking drum. Such a braking band is subject to comparatively heavy wear, which leads to abrasion and, consequently, the production of contaminants and which unfortunately affects the friction and hence the braking action of the braking band. Such a braking band further results in an unfavorable radial load on the bearing of the brake drum. Moreover, such a braking band is comparatively susceptible to variations in air humidity and temperature variations. Furthermore, such a braking band is comparatively expensive and relatively difficult to mount. Besides, such a braking band results in a comparatively high basic friction torque, which is undesirable because such a basic friction torque represents a permanent load which must be overcome in the case of driving.

SUMMARY OF THE INVENTION

It is an object of the invention to preclude the aforementioned problems and to provide an improved device. According to the invention, in order to achieve this object, a device of the type defined in the opening paragraph is characterized in that the braking member is formed by a coil spring having two spring arms which extend away from the braking drum, which spring arms each cooperate with an associated spring stop and of which one spring arm is movable away from its associated spring stop by means of the control portion of the control member in order to influence the braking action of the coil spring on the braking drum. The measures in accordance with the invention preclude soiling of the tension control means because a coil spring exhibits hardly any wear, which has the additional advantage that the coil spring hardly affects the braking action. The construction of the braking member as a coil spring further has the advantage that such a coil spring does not cause any radial load on the braking drum bearings. A coil spring further has the advantage that its behavior is substantially independent of variations in air humidity and temperature. Moreover, such a coil spring is comparatively cheap and can also be mounted very simply, i.e. preferably in an automated manner. By a suitable choice of the diameter of the braking drum and the diameter of the coil spring a construction which does not have a basic friction torque can be obtained.

A device in accordance with the invention which includes a limiting stop has the advantage that an undesirably large movement of the control member is precluded.

A device in accordance with an embodiment of the invention has the advantage that it enables tension control by means of a coil spring in the case of an elongate material which is drivable in two mutually opposed transport directions.

A device in accordance with another embodiment of the invention has the advantage that such a device assures that no basic friction torque occurs between the braking drum and the coil spring.

A device in accordance with another embodiment of the invention has proved to be advantageous in view of a compact construction of the tension control means.

The above-mentioned as well as further aspects of the invention will become apparent from the examples of an embodiments described hereinafter and will be elucidated with reference to these examples.

BRIEF DESCRIPTION OF THE DRAWINGS

The invention will now be described in more detail with reference to the drawings, which show examples of embodiments to which the invention is not limited. In the drawings

DETAILED DESCRIPTION OF THE PREFERRED EMBODIMENTS

Figure 1:
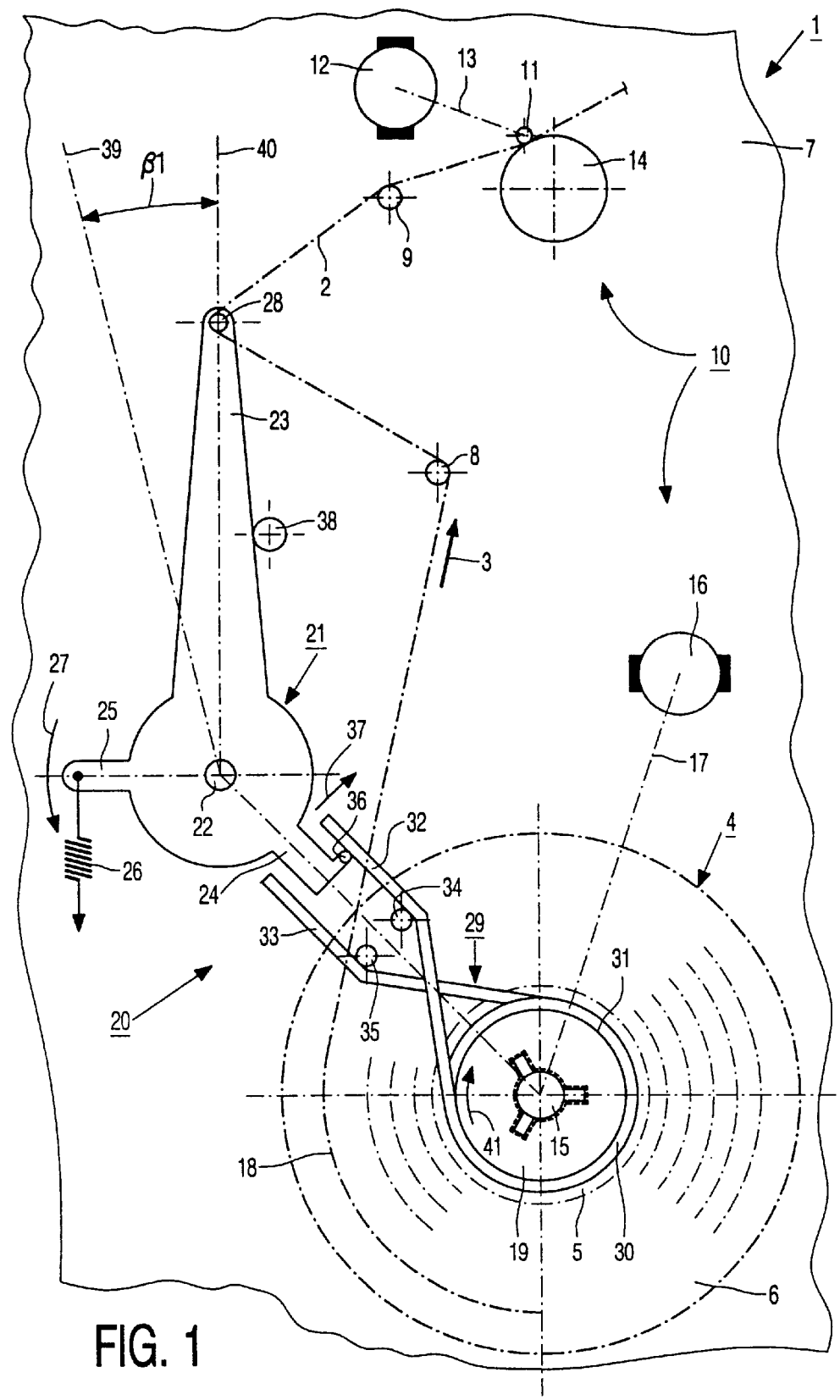
FIG. 1 is a diagrammatic plan view of a relevant part of a device in accordance with a first embodiment of the invention, i.e. a part of a magnetic tape apparatus having tension control means including a coil spring, by means of which it is possible to control the tension in a magnetic tape when it is unwound from a supply reel.

FIG. 1 shows a part of a device in accordance with the invention in which an elongate material which can be wound in the form a roll is drivable in a transport direction. The device in accordance with the invention is a magnetic-tape apparatus 1, namely a video recorder, in which the elongate material which can be wound in the form a roll is a magnetic tape 2, shown in dash-dot lines in FIG. 1. It is to be noted that of the magnetic tape apparatus in accordance with the invention only those parts which are relevant in the present context are shown because such magnetic tape apparatuses, i.e. such video recorders are well-known. An example of such a magnetic tape apparatus is the apparatus described in the document EP 0 182 419 B1 cited in the introduction. The subject matter disclosed in said document is incorporated herein by reference to this document.

In the magnetic tape apparatus 1 the magnetic tape 2 can be driven in a transport direction 3 indicated by an arrow in FIG. 1. The magnetic tape 2 is guided from a supply reel 4 shown in dash-dot lines in FIG. 1 to a take-up reel not shown in FIG. 1. The supply reel 4 comprises a hub 5 and two flanges 6 connected to the hub 5.

The magnetic tape apparatus 1 has a mounting plate 7. The mounting plate 7 carries two tape guide pins 8 and 9, which serve for guiding the magnetic tape 2.

The magnetic tape apparatus 1 has drive means 10 for driving the magnetic tape 2. The drive means 10 can drive the magnetic tape 2 in a transport direction 3. The drive means 10 include a tape drive capstan 11, which is rotatably supported in the mounting plate 7 and which can be driven with a constant number of revolutions by means of a motor 12 via a drive transmission 13, which is shown diagrammatically. A pressure roller 14 serves to cooperate with the tape drive capstan 11, which roller is movable in a manner not shown and can be applied to the tape drive capstan 11 under spring load. By means of the pressure roller 14 the magnetic tape 2 can be pressed against the tape drive capstan 11 so as to drive the magnetic tape 2 with a constant speed by means of the tape drive capstan 11 which is drivable with a constant number of revolutions.

The drive means 10 further include a winding spindle 15 which is rotatably supported on the mounting plate 7. The winding spindle 15 is in driving engagement with the hub 5 of the supply reel 4 and can be driven with a substantially constant driving torque by a motor 16 via a further drive transmission 17, which is shown diagrammatically. In this way, it is achieved that a roll 18 of the magnetic tape 2 wound on the supply reel 4 can be driven with a constant torque in order to wind the magnetic tape 2 onto the roll 18, the magnetic tape 2 being moved in a direction opposite to the transport direction 3.

The winding spindle 15 is in driving engagement with a cylindrical braking drum 19. In the present case, the braking drum 19 is coaxial with the winding spindle 15 and is integral with the winding spindle 15.

The magnetic tape apparatus 1 has tension control means 20 which serve for controlling the tension in the magnetic tape 2 when the magnetic tape 2 is driven in the one transport direction 3.

The tension control means 20 include a movably supported control member 21.

The control member 21 is of the lever type and is supported so as to be pivotable about a pivot 22, like a lever. The control member 21 has a first lever arm 23, a second lever arm 24 and a third lever arm 25.

The tension control means 20 include spring means, namely a tension spring 26. The tension spring 26 acts on the control member 21, namely on the third lever arm 25 of the control member 21. The tension spring 26 urges the control member 21 in a given direction of movement 27, indicated by an arrow in FIG. 1.

The tension control means 20 further include a sensor 28. The sensor 28 is arranged on the control member 21, namely on the free end of the first lever arm 23. In the present case, the sensor 28 is constructed as a cylindrical pin but it can alternatively take the form of a rotatably supported roller. The magnetic tape 2 is passed around the sensor 28. By means of the sensor 28 the control member 21 is movable against the given direction of movement 27, opposed by the force of the spring means, i.e. by the tension spring 26, in accordance with the tension occurring in the magnetic tape 2 when the magnetic tape 2 is driven in the one transport direction 3.

The tension control means 20 further include a flexible braking member, which in the present case is advantageously formed by a coil spring 29. The coil spring 29 has a plurality of turns 30 fitted around the cylindrical circumferential surface 31 of the brake braking drum 19. In the present case, the coil spring 29 has a plurality of turns, for example between five and ten turns. However, it is also possible to choose a different number of turns.

The coil spring 29 has two spring arms, i.e. a first spring arm 32 and a second spring arm 33, which extend away from the braking drum 19. The two spring arms 32 and 33 are angular and cross one another. The two spring arms 32 and 33 each cooperate with an associated spring stop 34 and 35, respectively. In the present magnetic tape apparatus 1 one of the two spring arms 32 and 33, namely the first spring arm 32, is movable in the direction indicated by an arrow 37 away from the first spring stop 34 by means of a control portion 36 of the control member 21 in order to influence the braking action of the coil spring 29 upon the braking drum 19. The control portion 36 of the control member 21 is formed by a control pin which projects from the second lever arm 24 of the control member 21.

In the magnetic tape apparatus 1 shown in FIG. 1 the diameter of the braking drum 19 and the diameter of the turns 30 of the coil spring 29 are selected in such a manner that the spring 29 is disposed on the braking drum 19 in an unloaded condition and substantially without friction when each spring arm 32 and 33 of the coil spring 29 cooperates with an associated spring stop, 34 and 35 respectively, and thus acts upon an associated spring stop, 34 and 35 respectively. This construction has the advantage that in operating conditions in which the tension control means 20 are inoperative the coil spring 29 does not exert any unnecessary load on the braking drum 19 and, consequently, on all the parts of the magnetic tape apparatus 1 which are in driving engagement with the braking drum 19.

The magnetic tape apparatus 1 further has a limiting stop 38 which is formed by a pin which is fixedly connected to the mounting plate 7 and which is adapted to cooperate with the control member 21, i.e. with the first lever arm 23 of the control member 21. When the magnetic tape 2 is driven in the one transport direction 3 the limiting stop 38 can limit the range of movement of the control member 21, i.e. the movement of the control member 21 under the influence of the tension of the magnetic tape 2. In FIG. 1 said range of movement of the control member 21 when the magnetic tape 2 is driven in the one transport direction 3 is illustrated by means of two dash-dot lines 39 and 40, which bound an angular range of movement β1. By means of the limiting stop 38 it is possible to preclude an undesirably large range of movement of the control member 21. When the first lever arm 23 of the control member 21 engages against the limiting stop 38, the control portion 36 lies just beside the first spring arm 32 of the coil spring 29 without exerting a load on the first spring arm 32, as a result of which the coil spring 29 is not loaded and does not exert a braking action on the braking drum 19.

The operation of the tension control means 20 will now be described hereinafter.

It is assumed that the magnetic tape apparatus 1 is set to a normal recording mode or a normal reproducing mode, in which the magnetic tape 2 is driven with a constant tape speed in the one transport direction 3 by means of the tape drive capstan 11 and the pressure roller 14. The magnetic tape 2 is then unwound from the supply reel 4 and the supply reel 4 is subjected to a given basic braking torque, which is caused by the further drive transmission 17 connected to the winding spindle 15 and by the stationary motor 16. When such driving of the magnetic tape 2 begins this basic braking torque causes a comparatively small tension in the magnetic tape 2, as a result of which the tension spring 26 pivots the control member 21 comparatively far into the angular range of movement β1 in the direction of movement 27, causing the control member 36 to move the first spring arm 32 comparatively far in the direction indicated by the arrow 37. Movement of the second spring arm 33 is then blocked by means of the spring stop 35. Thus, it is achieved that the turns 30 of the coil spring 29 are contracted comparatively strongly and consequently produce a comparatively high braking torque on the braking drum 19, as a result of which the winding spindle 15 and, as a consequence, the supply reel 4 are braked. This leads to an increase in tractive power, i.e. in tape tension in the magnetic tape 2 which is driven in the transport direction 3. Owing to the increased traction the control member 21 is pivoted against the direction of movement 27, opposed by the force of the tension spring 26, via the sensor 28, as a result of which the control portion 36 is also pivoted in this direction. As a consequence, the deflection of the first spring arm 32 is reduced, as a result of which the contraction of the turns 30 of the coil spring 29 decreases, so that the turns 30 of the coil spring 29 slightly expand and the braking torque on the braking drum 19 is reduced. The result of this is that the tension in the magnetic tape 2 decreases. Thus, as a result of the deflection of the first spring arm 32 in dependence on the instantaneous tension, i.e. the instantaneous variation of the tension in the magnetic tape 2 a variation of the braking action of the turns 30 on the braking drum 19 is achieved, which results in a control process which constantly restores the equilibrium of forces.

The construction of the tension control means 20 with the aid of a coil spring 29 has several advantages. Such a coil spring 29 can be mounted easily, preferably in an automated manner. Furthermore, it is comparatively cheap and resistant to wear. Moreover, it is substantially immune to climatological influences and temperature influences and, finally, it also has the advantage that it does not exert any radial forces on the bearing of the braking drum 19.

In the magnetic tape apparatus 1, in which the braking drum 19 is coaxial with the winding spindle 15, the braking drum 19 has a direction of rotation as indicated by the arrow 41 during operation of the tension control means 20. This means that the tangential component of the speed of rotation of the braking drum 19 which occurs in the area of the transition from the turns 30 to the first spring arm 32 of the coil spring 29 is directed towards the spring arm 32. This is advantageous because it guarantees a comparatively soft control action. However, in a modified magnetic tape apparatus it is alternatively possible not to arrange a braking drum coaxially with a winding spindle but to support it rotatably on a mounting plate by means of a separate bearing and to keep the braking drum in driving engagement with the winding spindle in such a manner that the braking drum is driven in a direction of rotation opposite to that indicated in FIG. 1, in which case the tangential component of the speed of rotation of the braking drum which occurs in the transition area between the turns and the spring arm of the coil spring used for the purpose of tension control is directed away from this spring arm, which results in a comparatively hard control action.

Figure 2:
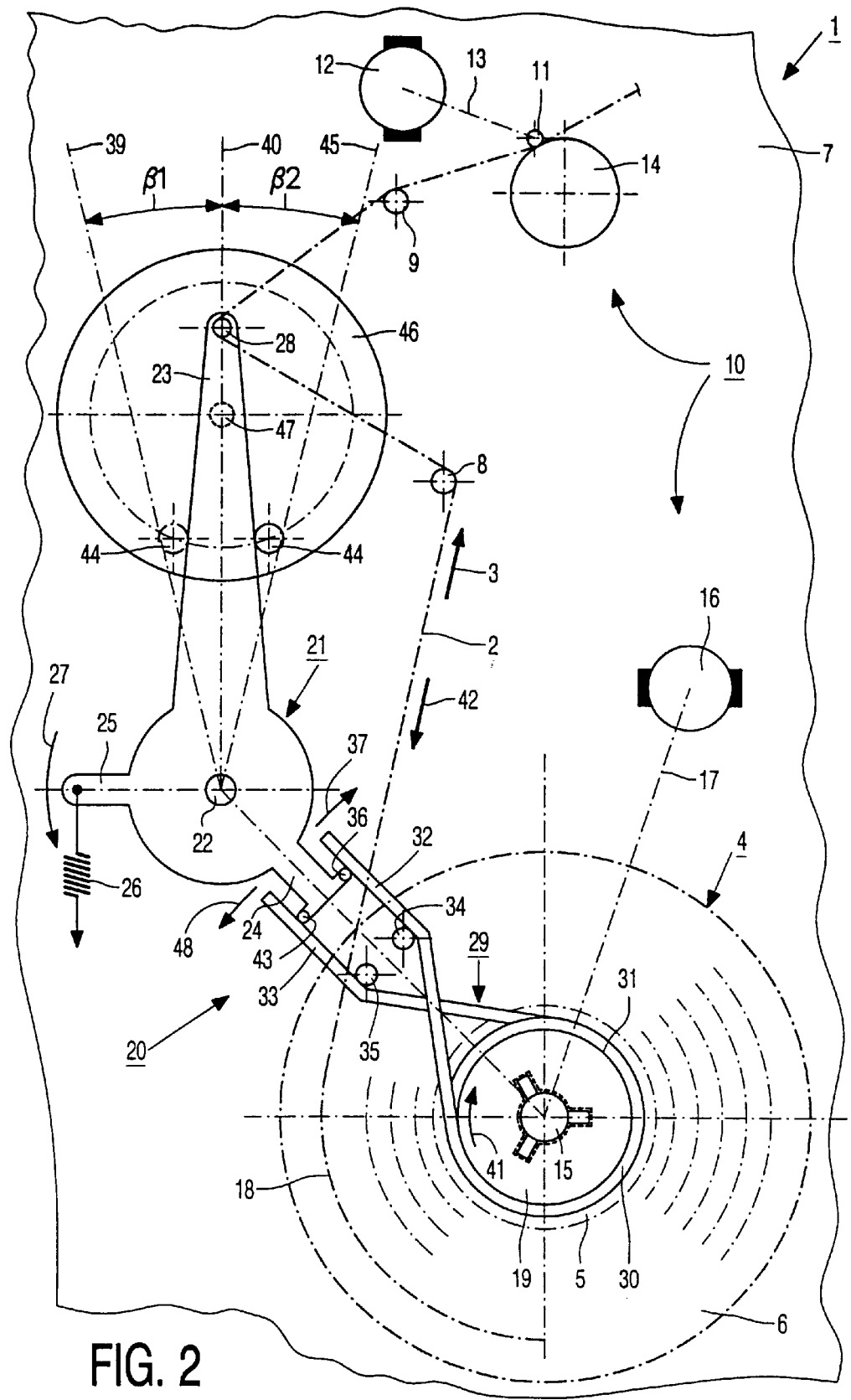
FIG. 2, in a view similar to that of FIG. 1, shows a part of a device in accordance with a second embodiment of the invention, i.e. a part of a magnetic tape apparatus having tension control means including a coil spring, by means of which it is possible to control the tension in a magnetic tape both when it is unwound from a supply reel and when it is wound onto this supply reel.

FIG. 2 shows a part of a magnetic tape apparatus 1 which in many respects has the same construction as the magnetic tape apparatus 1 shown in FIG. 1.

However, in the magnetic tape apparatus 1 shown in FIG. 2 the magnetic tape 2 can be driven not only in the one transport direction 3 but also in a transport direction 42 opposite to the one transport direction 3, as is indicated by a further arrow in FIG. 2. In the magnetic tape apparatus 1 shown in FIG. 2 the tension in the magnetic tape 2 can be controlled both in the one transport direction 3 and in the opposite transport direction 42.

To control the tension in the magnetic tape 2 in both transport directions 3 and 42 tension control means 20 are used, which differ basically from the tension control means 20 of the magnetic tape apparatus 1 shown in FIG. 1 in that the second lever arm 24 of the control member 21 have not only a control portion 36 but, in addition, a second control portion 43, which is also formed by a control pin 43 which projects from the second lever arm 24. In the tension control means 20 of the magnetic tape apparatus 1 shown in FIG. 2 each of the two spring arms 32 and 33 of the coil spring 29 is movable by means of a respective control portion 36 or 43 of the control member 21 in order to influence the braking action of the coil spring 29 on the braking drum 19.

The magnetic tape apparatus 1 shown in FIG. 2 has a movable limiting stop 44. The movable limiting stop 44, similarly to the stationary limiting stop 38 of the magnetic tape apparatus 1 shown in FIG. 1, is adapted to cooperate with the control member 21. However, the movable limiting stop 44 is movable into two limiting positions which each correspond to one of the transport directions 3 and 42, respectively, the limiting position corresponding to the one transport direction 3 being shown by means of a solid line and the limiting position corresponding to the opposite transport direction 42 being shown by means of a dash-dot line in FIG. 2.

When the limiting stop 44 is in its limiting position shown by means of a solid line, the limiting stop 44 can limit the range of movement of the control member 21 when the magnetic tape 2 is driven in the one transport direction 3, i.e. the movement of the control member 21 under the influence of the tension of the magnetic tape 2 can be limited. Said range of movement lies between the two dash-dot lines 39 and 40 in FIG. 2, which bound an angular range of movement β1. If the limiting stop 44 is in its limiting position shown by means of a dash-dot line the limiting stop 44 can limit the range of movement of the control member 21 when the magnetic tape 2 is driven in the opposite transport direction 42, i.e. the movement of the control member 21 under the influence of the tension spring 26 can be limited. The afore-mentioned range of movement of the control member 21 lies between a dash-dot line 45 and a dash-dot line 40 shown in FIG. 2. The two dash-dot lines 45 and 40 bound a angular range of movement β2.

To move the limiting stop 44 between its two limiting positions the limiting stop 44 is mounted on a rotatable disc 46, which is rotatably supported on the mounting plate 7 by means of a bearing 47 and which can be driven in a manner not shown in order to bring the limiting stop 44 into the limiting position corresponding to the selected transport direction 3 or 42 of the magnetic tape 2.

When the magnetic tape 2 is driven in the one transport direction 3, i.e. when the magnetic tape 2 is unwound from the supply reel 4, the operation of the tension control means 20 in the magnetic tape apparatus 1 shown in FIG. 2 is identical to the operation of the tension control means 20 in the magnetic tape apparatus 1 shown in FIG. 1. This means that during controlling the control member 21, i.e. its first lever arm 23, moves within the angular range of movement β1. The movement of the control member 21 under the influence of the tension of the magnetic tape 2 is then limited by the limiting stop 44 which is in its limiting position shown in solid lines. If owing to a high tension the first lever arm 23 of the control member 21 actually engages against limiting stop 44 which is in its limiting position shown by means of a solid line, this results in the two control portions 36 and 43 on the second lever arm 24 of the control member 21 being interposed between the two spring arms 32 and 33 of the coil spring 29 in such a manner that the two spring arms 32 and 33 are substantially not loaded and engage against the spring stops 34 and 35, as a result of which the coil spring 29 no longer exerts any braking action on the braking drum.

It is necessary to prevent a further movement of the control member 21 beyond the position indicated by the dash-dot line 40 when the tension in the magnetic tape 2 increases further because otherwise the control portion 43 would cooperate with the second spring arm 33 and would lift the spring arm 33 off the spring stop 35 and cause the turns 30 of the coil spring 29 to be contracted, which in spite of the already existing high tension in the magnetic tape 2 would give rise to braking of the braking drum 19 and, consequently, of the winding spindle 15 and the roll 18, causing an additional increase of the tension in the magnetic tape 2 and, eventually, self-braking and possibly damaging or destruction of the magnetic tape 2.

However, if desired, said effect of the initiation of self-braking can also be used intentionally in the case that this self-braking effect is to be used for fully braking the winding spindle 15 and, consequently, of the reel 4. In this case, the limiting stop 44 can be moved intentionally out of the limiting position shown by means of a solid line in FIG. 2, thus enabling the control member 21 to be moved into the angular range of movement β2, which leads to a self-braking effect when the magnetic tape 2 is driven in the one transport direction 3, as result of which the supply reel 4 is completely braked.

If the magnetic tape 2 is driven in the opposite transport direction 42 by means of the tape drive capstan 11 and the pressure roller 14, the limiting stop 44 is moved into its limiting position shown by means of a dash-dot line in FIG. 2 with the aid of the disc 46 before the magnetic tape 2 is actually driven in the opposite transport direction 42. When the magnetic tape 2 is subsequently driven in the opposite transport direction 42 the winding spindle 15 and, consequently, the supply reel 4 is driven with a constant torque by the motor 16 via the drive transmission 17. This constant torque produces a given tension in the magnetic tape 2 in the case of a comparatively small winding radius, which subsequently decreases in proportion to the increase in winding radius. In order to maintain the tension in the magnetic tape 2 constant it is therefore necessary to increase the driving torque exerted on the supply reel 4 as the tension in the magnetic tape 2 decreases. This is achieved in that a tension dependent braking torque is exerted on the braking drum 19, in such a manner that as the tension diminishes the decrease of the inherently constant torque produced by the motor 16 is reduced, i.e. the driving torque which acts on the supply reel 4 is increased and, as a result of this, an increase of the tension in the magnetic tape 2 is achieved.

When the magnetic tape 2 is driven in the opposite transport direction 42 the tension of the magnetic tape 2 wound onto the supply reel 18 is determined by means of the sensor 28 and the control member 21 is pivoted accordingly within the angular range of movement β2. This pivotal movement is opposed by the force of the tension spring 26 and is opposite to the given direction of movement 27. As a result of this movement of the control member 21 the second spring arm 33 of the coil spring 29 is moved away from the second spring stop 35 via the control portion 43 in the direction indicated by the arrow 48. Owing to this movement of the second spring arm 33 the turns 30 of the coil spring 29 contract and produce a braking torque on the braking drum 19, as a result of which the constant torque produced by the motor 16 is reduced and the supply reel 4 is consequently driven with a reduced driving torque. As a result of the reduced driving torque the tension in the magnetic tape 2 is reduced so that an equilibrium of forces is established.

When the tension in the magnetic tape 2 decreases owing to the increase in diameter as the magnetic tape 2 is wound onto the roll 18, this results in the control member 21 being deflected less far via its sensor 28 because the tension spring 26 pulls the control member 21 in the direction indicated by the arrow 27. As a result of this, the second spring arm 33 is deflected less far via the control portion 43, causing the turns 30 of the coil spring 29 to expand slightly and, consequently, the turns 30 of the coil spring 29 to produce a smaller braking torque on the braking drum 19, which in its turn results in an increase of the driving torque which acts on the supply reel 4. This increase of the driving torque leads to an increase of the tension in the magnetic tape 2, which is driven in the opposite transport direction 42, and thus to a new equilibrium of forces.

When the magnetic tape 2 is driven in the opposite transport direction 42 the movement of the control member 21 under the influence of the tension spring 26 is limited by means of the limiting stop 44, which is then in its limiting position shown by means of a dash-dot line, so that the control member 21, i.e. the first lever arm 23 of the control member 21, cannot be moved beyond the position indicated by the dash-dot line 40. When the control member 21 occupies this position, the two control portions 36 and 43 on the second lever arm 24 of the control member 21 are again disposed between the two spring arms 32 and 33 of the coil spring 29 in such a manner that the two spring arms 32 and 33 abut against the spring stops 34 and 35 and the coil spring 29 with its turns 30 does not load the braking drum 19. The afore-mentioned limitation of the movement of the control member 21 is necessary because in the absence of this limitation the first lever arm 23 of the control member 21 would be pivoted into the angular range of movement β1 owing to a very small tension in the magnetic tape 2 which is driven in the opposite transport direction 42, as a result of which the control portion 36 would cause a movement of the first lever arm 32 and, consequently, a further braking of the braking drum 19 and thus of the supply reel 4, which would lead to a further reduction of the tension in the magnetic tape 2 although the tension is already very small or too small at any rate.

The magnetic tape apparatus 1 shown in FIG. 2 has only one movable limiting stop 44, which is movable between two limiting positions. Alternatively, a modification of such a magnetic tape apparatus may have two limiting stops which are each movable into limiting position corresponding to a transport direction of the magnetic tape.

The magnetic tape apparatus 1 shown in FIG. 2 has the great advantage that by means of a coil spring 29 a tension control is realized for two mutually opposite transport directions 3 and 42 of a magnetic tape 2.

Figure 3:
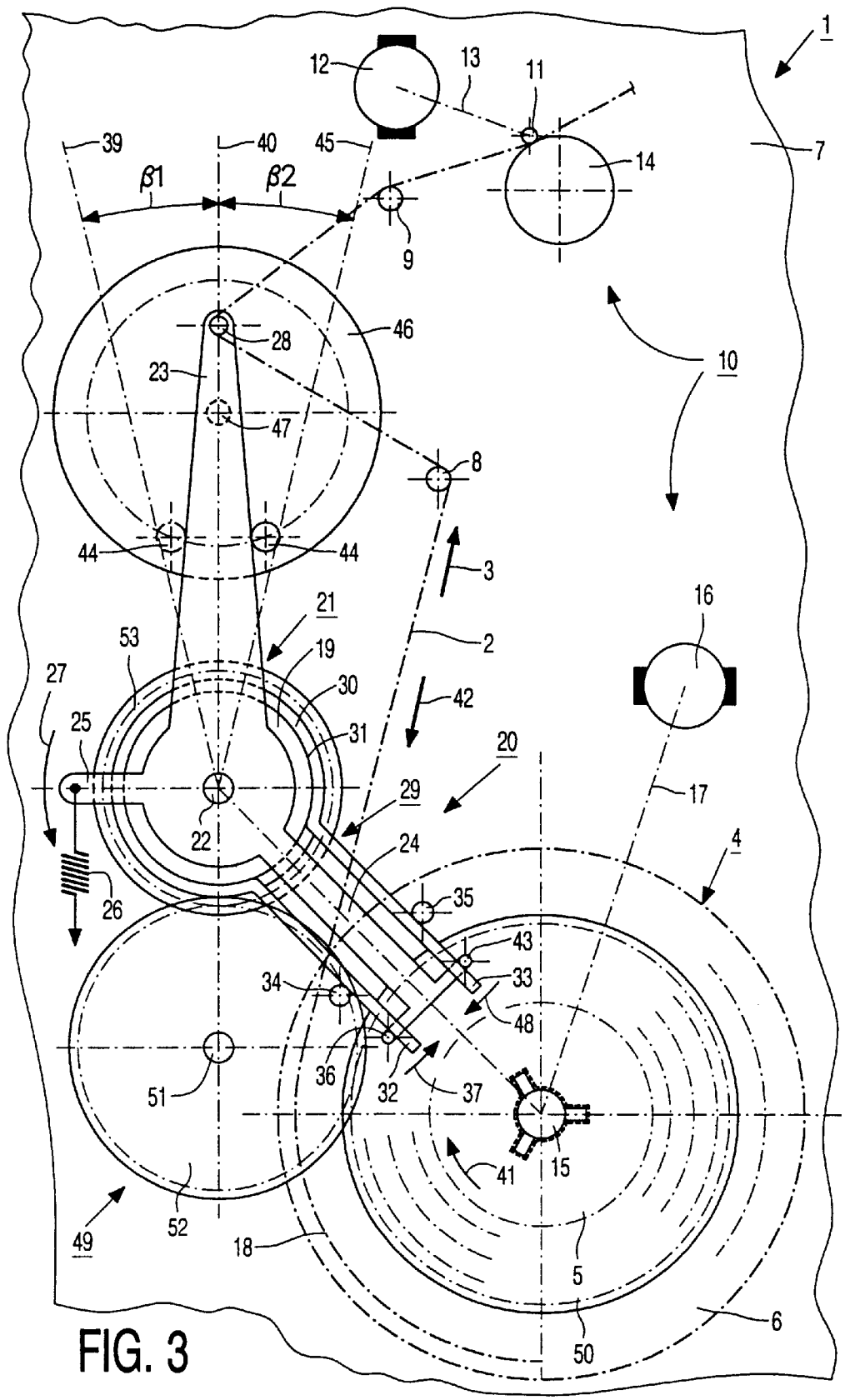
FIG. 3, in a view similar to those of FIGS. 1 and 2, shows a part of a device in accordance with a third embodiment of the invention, i.e. also a part of a magnetic tape apparatus having tension control means including a coil spring, by means of which it is possible to control the tension in a magnetic tape both when it is unwound from a supply reel and when it is wound onto this supply reel.

FIG. 3 shows a relevant part of a magnetic tape 1 in which some elements are constructed and arranged in a manner identical to that in the magnetic tape apparatus 1 shown in FIG. 2. In the magnetic tape apparatus 1 shown in FIG. 3 a magnetic tape 2 can also be driven in two mutually opposite transport directions 3 and 42, the tension in the magnetic tape 2 being controllable by tension control means 20 in both transport directions 3 and 42.

In the magnetic tape apparatus 1 shown in FIG. 3 the braking drum 19 is rotatably supported coaxially with the pivot 22 of the control member 21. To obtain a drive transmission between the braking drum 19 and the winding spindle 15 a gear transmission 49 is used. The gear transmission 49 comprises a first gear wheel 50, which is coaxial with the winding spindle 15 and integral with the winding spindle 15, a second gear wheel 52, which is rotatably supported on the mounting plate 7 by means of a bearing 51, and a third gear wheel 53, which is coaxial with the braking drum 19 and integral with the braking drum 19.

A coil spring 29 is fitted onto the braking drum 19 as the braking member and also comprises a first spring arm 32 and a second spring arm 33. In the present case, the two spring arms 32 and 33 are not angular and do not cross one another but have a straight shape. Each of the two spring arms 32 and 33 cooperates with a spring stop 34 and, respectively. In relation to the spring arms 32 and 33 the two spring stops 34 and 35 are disposed outside the area between the two spring arms 32 and 33. This is in contradistinction to the spring stops 34 and 35 in the two magnetic tape apparatuses shown in FIGS. 1 and 2, in which the spring stops 34 and 35 are disposed in the area between the two spring arms 32 and 3.

The operation of the tension control means 20 in the magnetic tape apparatus 1 shown in FIG. 3 is substantially identical to the operation of the tension control means 20 of the magnetic tape apparatus 1 shown in FIG. 2.

When in the magnetic tape apparatus 1 shown in FIG. 3 the magnetic tape 2 is driven in the one transport direction 3, the control member 21 is movable with its first lever arm 23 into the angular range of movement β1, the control portion 36 then cooperating with the first spring arm 32 in order to influence the braking action of the coil spring 29 on the braking drum 19 and movement of the second spring arm 33 being blocked by means of the second spring stop 35.

When the magnetic tape 2 is driven in the opposite transport direction 42 the control member 21 is movable into the second angular range of movement β2, the control portion 43 then cooperating with the second spring arm 33 in order to influence the braking action of the coil spring 29 on the braking drum 19 and movement of the first spring arm 32 being blocked by means of the first spring stop 34.

The invention is not limited to the three embodiments described hereinbefore by way of examples. For example, modified tension control means may have a control member comprising two control portions which are each adapted to cooperate with a spring arm of a coil spring but which control portions have locations where they act on the spring arms situated at different distances from the winding axis of the coil spring. Furthermore, it is possible to provide tension control means having, for example, two coil springs instead of only one coil spring, in which case one coil spring can be used for tension control in one transport direction and the other coil spring for tension control in the opposite transport direction. Devices in accordance with the invention need not be magnetic tape apparatuses but can also be printers with driven ink ribbons or thread winding machines.

What is claimed is:

1. A device (1)
   in which an elongate material (2) which can be wound in the form of a roll is drivable in a first transport direction (3) and
   which has drive means (10) for driving the material (2) in the first transport direction (3), which drive means (10) comprise a winding spindle (15) for driving a roll (18) of the material (3), which winding spindle (15) is in driving engagement with a cylindrical braking drum (19), and
   which has tension control means (20) for controlling the tension which occurs in the material (2) when the material (2) is driven in the first transport direction (3), which tension control means (20) comprise
   a movably supported control member (21) and
   spring means (26) which act on the control member (21) and which load the control member (21) in a given direction of movement (27), and
   a sensor (28) arranged on the control member (21), around which sensor the material (2) is passed and via which the control member (21) is movable against the given direction of movement (27), opposed by the force of the spring means (26), in accordance with the tension occurring in the material (2) when the material (2) is driven in the first transport direction (3), and
   a flexible braking member which is passed around the cylindrical circumferential surface (31) of the braking drum (19) and which has a movable braking member portion which extends away from the braking drum (19) and is movable with the aid of a control portion (36) of the control member (21) in order to influence the braking action of the braking member on the braking drum (19),
   characterized in that
   the braking member is formed by a coil spring (29) and the coil spring (29) has two spring arms (32, 33) which extend away from the braking drum (19), which spring arms (32,33) each cooperate with an associated spring stop (34, 35) and of which one spring arm (32) is movable away from its associated spring stop (34) by means of the control portion (36) of the control member (21) in order to influence the braking action of the coil spring (29) on the braking drum (19).

2. A device (1) as claimed in claim 1, characterized in that it includes a limiting stop (38; 44) adapted to cooperate with the control member (21), by means of which limiting stop (38; 44) the range of movement (β1) of the control member (21) can be limited when the material (2) is driven in the first transport direction (3).

3. A device (1) as claimed in claim 1, characterized in that, in addition, the material (2) can be driven in a second transport direction opposite to the first transport direction (3), and
   each of the two spring arms (32, 33) of the coil spring (29) is movable with the aid of a control portion (36; 43) of the control member (21) in order to influence the braking action of the coil spring (29) on the braking drum (19), and it includes at least one movable limiting stop (44) adapted to cooperate with the control member (21), which limiting stop (44) is movable into at least one limiting position associated with one of the first and second transport directions (3, 42) and by means of which a range of movement ($\beta 1$, $\beta 2$) of the control member (21) can be limited when the material (2) is driven.

4. A device (1) as claimed in claim 1, characterized in that the coil spring (29) is disposed on the braking drum (19) in an unloaded condition and substantially without friction when each of the spring arms (32, 33) of the coil spring (29) cooperates with the associated spring stop (34, 35) and thus acts upon an associated spring stop (34, 35).

5. A device (1) as claimed in claim 1, characterized in that the control member (21) is supported so as to be pivotable about a pivot (22) and has a first lever arm (23) and a second lever arm (24), and the sensor (28) is arranged on the first lever arm (23) and the control portion (36; 43) is arranged on the second lever arm (24) in order to influence the braking action of the coil spring (29).

6. A device (1) as claimed in claim 5, characterized in that the braking drum (19) is rotatably supported coaxially with the pivot (22) of the control member (21), and the braking drum (19) is in driving engagement with the winding spindle (15) via a gear transmission (49).

7. A device (1) as claimed in claim 1, characterized in that the device (1) takes the form of a magnetic tape apparatus and the elongate material (2) is then formed by a magnetic tape.

* * * * *